United States Patent [19]

Tomosada et al.

[11] 4,408,869
[45] Oct. 11, 1983

[54] DIGITAL DISPLAY DEVICE CONTROLLED BY A MICROCOMPUTER

[75] Inventors: Masahiro Tomosada, Kawasaki; Katsuyoshi Maeshima, Tokyo, both of Japan

[73] Assignee: Canon Kabushiki Kaisha, Tokyo, Japan

[21] Appl. No.: 231,109

[22] Filed: Feb. 3, 1981

[30] Foreign Application Priority Data

Feb. 8, 1980 [JP] Japan .................................. 55-15084

[51] Int. Cl.³ .......................................... G03G 15/00
[52] U.S. Cl. .......................... 355/14 R; 355/14 C; 355/3 R; 364/200; 364/518; 364/519; 340/706; 340/718
[58] Field of Search ............. 355/14 C, 14 CU, 14 R, 355/3 R; 364/200, 100, 107, 518, 519, 523; 340/146.3 H, 146.3 Y, 146.3 ED, 706, 718, 732, 736

[56] References Cited

U.S. PATENT DOCUMENTS

4,035,072  7/1977  Deetz et al. .................. 355/14 C
4,099,860  7/1978  Connin ........................ 355/14 C Primary Examiner—A. C. Prescott
Attorney, Agent, or Firm—Fitzpatrick, Cella, Harper & Scinto

[57] ABSTRACT

There is disclosed a display device for a copier, such display unit being provided with a display generator which generates signals at a determined time interval. A microcomputer is provided with a program interruption port for receiving the signal from the signal generator and performs dynamic drive of the display unit by the signal. The dynamic display control is achieved by interruption signals externally supplied at a determined time interval to the computer. Therefore, a constant display drive timing is maintained regardless of the execution time of the main program and an ensured dynamic display control without flicker in display is obtained.

21 Claims, 10 Drawing Figures

PRIOR ART

DIGITAL DISPLAY DEVICE CONTROLLED BY A MICROCOMPUTER

BACKGROUND OF THE INVENTION

1. Field of the Invention

The present invention relates to a display device driven by a microcomputer having an interruption port.

2. Description of the Prior Art

The display devices for a copier, for indicating copy number, cassette size, paper jamming, waiting state etc. are driven either by static method or by dynamic method. As the driving microcomputer is generally utilized also for other functions such as key entry and copy process control, the dynamic drive is usually employed for the display devices in consideration for example of the limitation in the number of ports. In such dynamic drive each display digit must be driven at an interval so as not to cause a flickering impression on the eyes.

Thus, in a microcomputer control of the display devices for the copier, it has been necessary to divide the main program for controlling the copy process and to insert the program for display at appropriate timings. Consequently a fluctuating execution time of the main program gives rise to irregular drive intervals causing a flickering display, and the prevention of such phenonmenon requires insertion of an excessive number of unnecessary steps.

Figure 1:
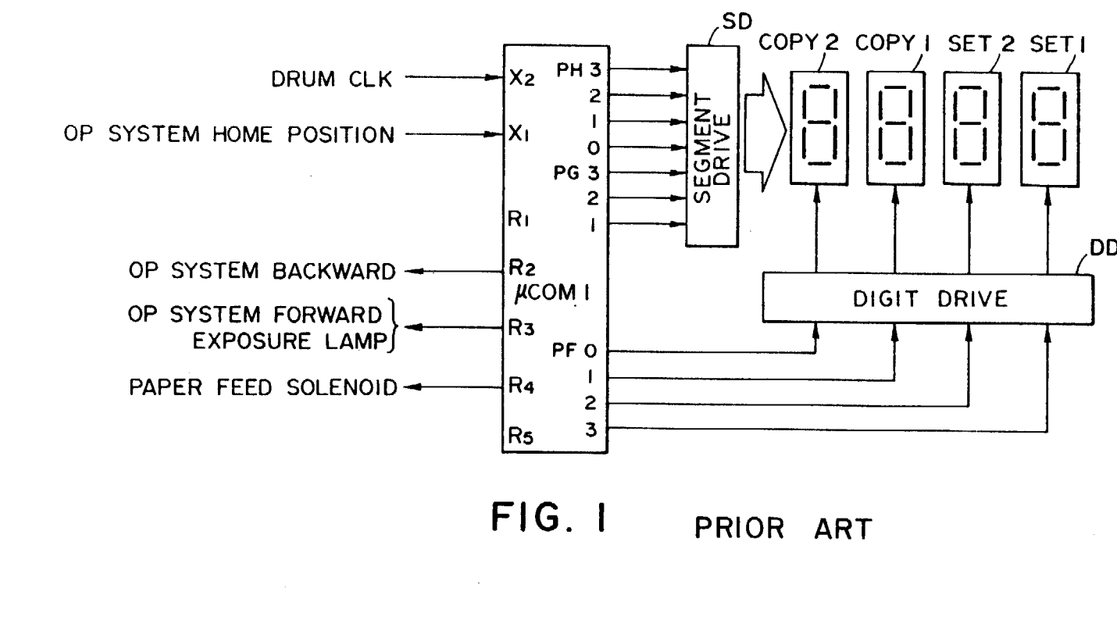
FIG. 1 is a block diagram showing a conventional microcomputer-controlled display system for a copier.

FIG. 1 shows a conventional microcomputer-controlled display system for a copier, in which there are shown a one-chip microcomputer $\mu$COM; 7-segment display elements SET 1, SET2, COPY1 and COPY2 composed of light-emitting diodes or liquid crystal display elements in which SET1 and SET2 respectively display the first and second digit of the copy set number while COPY1 and COPY2 respectively display the first and second digit of the copy counter; a segment drive SD for driving the segments of said display elements SET1, SET2, COPY1 and COPY2 in response to segment signals from output ports PH0-3 and PG1-3 of the microcomputer $\mu$COM; and a digit driver DD for lighting said display device SET1, SET2, COPY1 or COPY2 according to said segment signals and in response to a digit signal from output ports PF0-3 of the microcomputer $\mu$COM.

Also there are shown an output port R2 for releasing an optical system backward signal upon completion of the original scanning; an output port R3 for releasing a signal for the forward movement of the optical system and for activating the exposure lamp at the start of the original scanning; and an output port R4 for releasing a paper feed signal for energizing a paper feed solenoid at an appropriate timing for paper feeding to lower a constantly rotated paper roll 28, thereby initiating the paper feeding.

Figure 2:
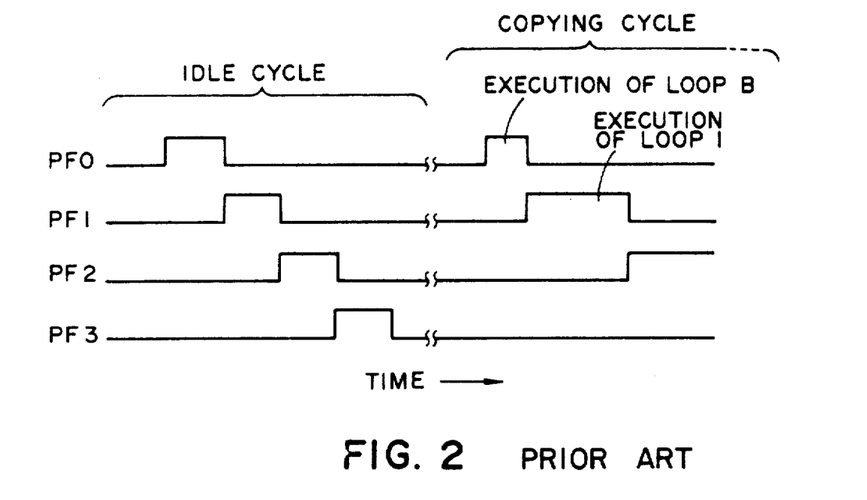
FIG. 2 is a timing chart of the display control system shown in FIG. 1.

The timings of said signals are shown in FIG. 2. During the idle cycle, the digit signals PF0-3 are maintained at a determined duty ratio as shown in the left-hand portion, as the microcomputer repeats the display of the copy counter and the sensing of key entry in this state. However, once the copy cycle is initiated, although the key entry reading is no longer necessary, the microcomputer has to maintain the dynamic display drive and, in addition, has to perform the reading through a port X2 of drum clock pulses DCK which are optically, magnetically or mechanically generated for tracing the functional position of the copying apparatus and the counting of said clock pulses. The flow chart of such procedure is shown in FIG. 3, wherein the loop "a" indicates the level-1 period of the wave form of said drum clock pulse DCK, while the loop "b" indicates the level-0 period of said pulse.

Figure 3:
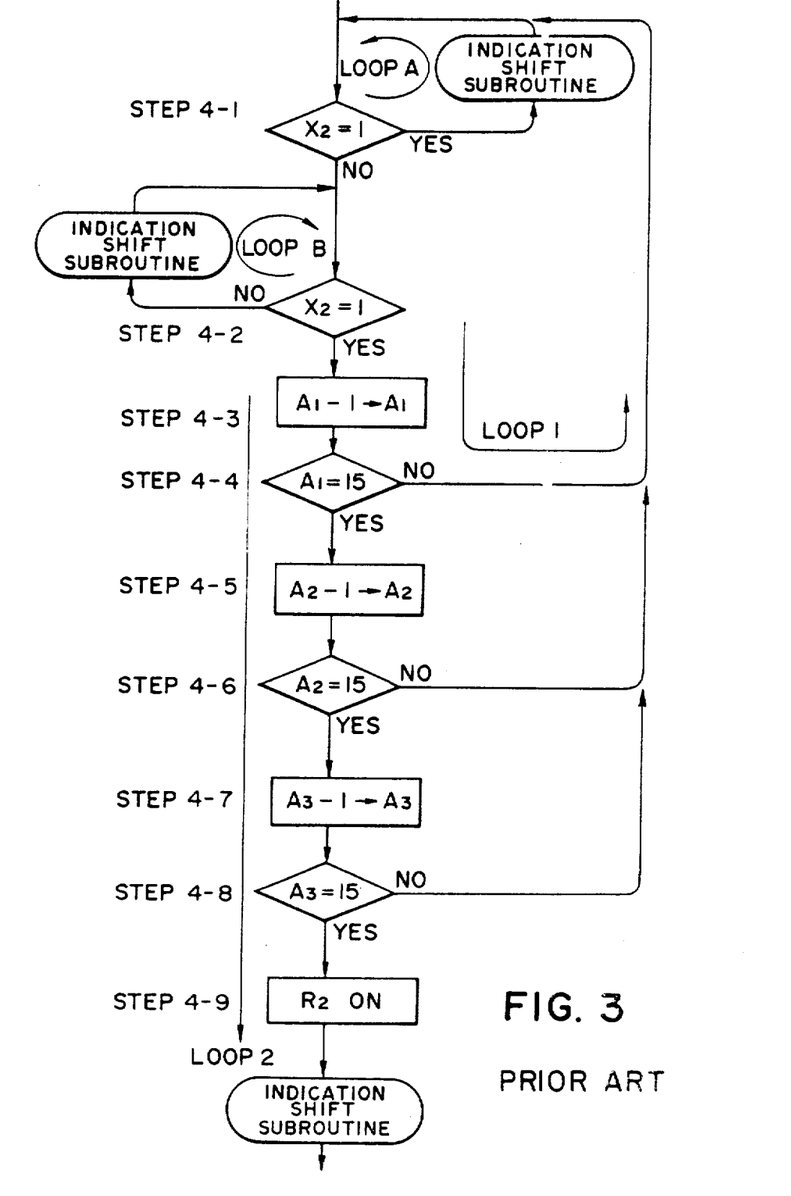
FIG. 3 is a control flow chart thereof.
Figure 4:
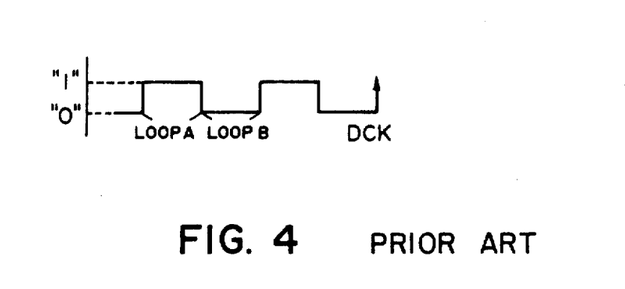
FIG. 4 is a waveform chart of drum clock pulses.

In the flow chart shown in FIG. 3, the microcomputer identifies in the step 4-1 whether the input port X2 for the drum clock pulse is at the level-1 state, then, if X2=1, executes an unrepresented subroutine for display switching, proceeds to the step 4-2 at the trailing end of the drum clock pulse to again identify whether said port X2 is at level-1, then executes the display switching subroutine if X2=0, and proceeds to the step 4-3 at the leading end of the drum clock pulse. In said step 4-3, the content of a memory address A1 storing the first digit of a predetermined pulse number is reduced by one, and the thus reduced number is again stored in said memory address A1. The above-mentioned memory address A1 and other memory addresses A2, A3, to be explained later, store said pulse number to be counted in a hexadecimal code. In the succeeding step 4-4 the microcomputer identifies whether the content of said memory address A1 is equal to 15, and if not, the program returns to the step 4-1. The counting is continued in this manner, and, when A1=15 is reached, the program proceeds to the step 4-5 in which the content of the memory address A2 storing the second digit of said predetermined pulse number is decreased by one and the thus reduced number is again stored in said memory address A2. In the succeeding step 4-6 the microcomputer identifies whether the content of said memory address A2 is equal to 15, and, if not, the program returns to the step 4-1. A similar procedure is repeated also for the memory address A3 storing the third digit of said predetermined pulse number, and the pulse counting is completed when the contents of said memory addresses A1, A2 and A3 all become equal to 15, whereupon the output port R2 is set to release the optical system backward signal.

Thus, in case the clock pulse DCK is shifted to the level-1 state after resetting of the signal PF0 and setting of the signal PF1 in the display switching subroutine during the preceding loop b, the resetting of the signal PF1 and setting of the signal PF2 take place in a subsequent display switching subroutine after the loop 1 and the repitition of step 4-1 unless a state A1=15 is reached in the counting procedure. As each step in the flow chart requires a constant execution time, the output signals from the ports PF0 and PF1 present significantly different duty ratios as shown in the right-hand portion of FIG. 2, leading to correspondingly different display periods of the elements COPY1 and COPY2, thus giving rise to a flickering display. Such phenomenon has been unavoidable, fundamentally arising from sequential control of the microcomputer.

SUMMARY OF THE INVENTION

The object of the present invention is to provide a microcomputer-controlled display device without the above-mentioned drawbacks.

Another object of the present invention is to provide a display device in which the dynamic display drive is controlled by program interruption signals externally provided at a determined time interval to the microcomputer.

Still another object of the present invention is to provide a display device in which the dynamic display drive or key entry sensing is performed by program interruption signals externally provided at a determined time interval to the microcomputer.

Still another object of the present invention will become fully apparent from the following description.

DESCRIPTION OF THE PREFERRED EMBODIMENTS

Now the present invention will be clarified in detail by the embodiments thereof shown in the attached drawings.

Figure 5:
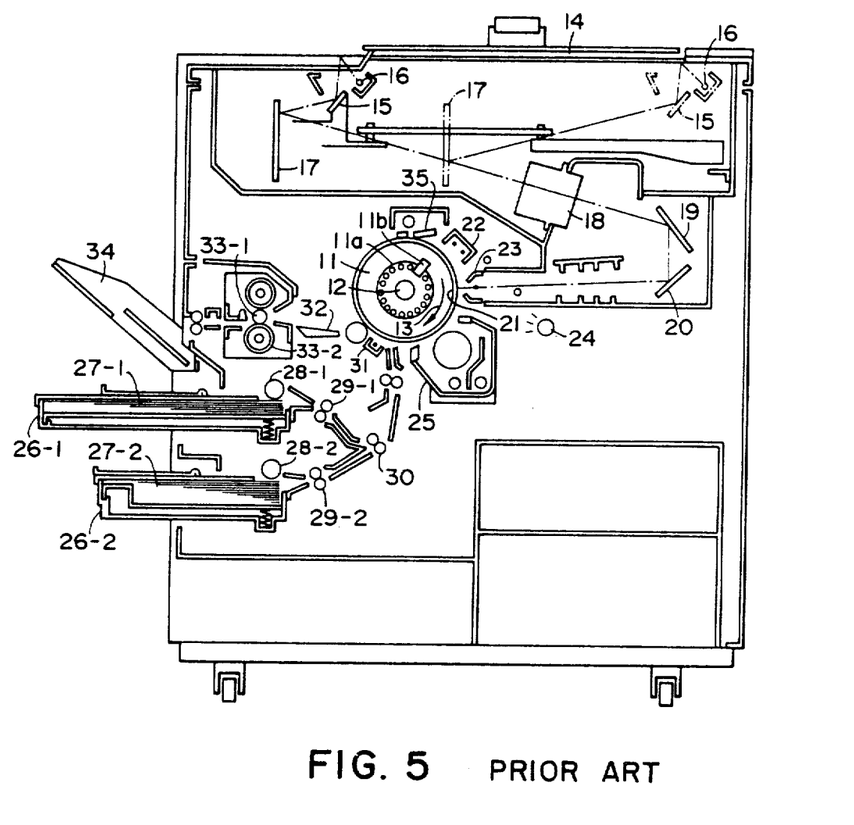
FIG. 5 is a cross-sectional view of a copier in which the present invention is applicable.

FIG. 5 shows the cross-sectional view of a copier in which the present invention is applicable, wherein a drum 11, peripherally provided with a three-layered photosensitive member utilizing a CdS photoconductor, is rotatably supported on a shaft 12 and set into rotation in the direction of the arrow 13 in response to a copy start signal.

Upon arrival of said drum 11 at a determined position, an original placed on an original carriage 14 is illuminated by an illuminating lamp 16 integrally structured with a first scanning mirror 15, and the reflected light is scanned by said first scanning mirror 15 and a second scanning mirror 17, which are displaced with a speed ratio of 1:½ to maintain a constant optical path length in front of a lens 18 during the original scanning.

The image of the original thus reflected is guided through said lens 18, a third mirror 19 and a fourth mirror 20 and is focused, in an exposure station 21, onto the drum 11.

The drum 11 is subjected to slit exposure of said image in said exposure station 21 after being charged, for example positively, by a primary charger 22.

The drum 11 is subjected, simultaneously with said exposure, to a DC charge elimination or an AC charge elimination of a polarity opposite to that of the primary charging by means of a charge eliminator 23, and subsequently subjected to a flush exposure by a whole surface exposure lamp 24 to form an electrostatic latent image of an elevated contrast on said drum 11. Said electrostatic latent image is rendered visible as a toner image in a developing station 25.

A transfer sheet 27-1 or 27-2 in a cassette 26-1 or 26-2 is supplied into the apparatus by a feed roller 28-1 or 28-2, and forwarded toward the drum 11 through a first register roller 29-1 or 29-2 for approximate timing adjustment and a second register roller 30 for exact timing adjustment.

The toner image present on the drum 11 is transferred onto said transfer sheet during the passage thereof between a transfer charger 31 and the drum 11.

After said image transfer, the transfer sheet is guided by a conveyor belt 32 to paired fixing rollers 33-1, 33-2 for image fixing with heat and pressure, and ejected to tray 34.

Also the drum 11, after the image transfer, is subjected to a surface cleaning step in a cleaning station 35 composed of an elastic blade and proceeds to the subsequent imaging cycle.

For the purpose of controlling the above-explained imaging cycle, there are generated drum clock pulses DCK by means of a clock disk 11a rotated with said drum 11 and a sensor 11b for optically detecting clock dots provided on said disk.

Figure 6:
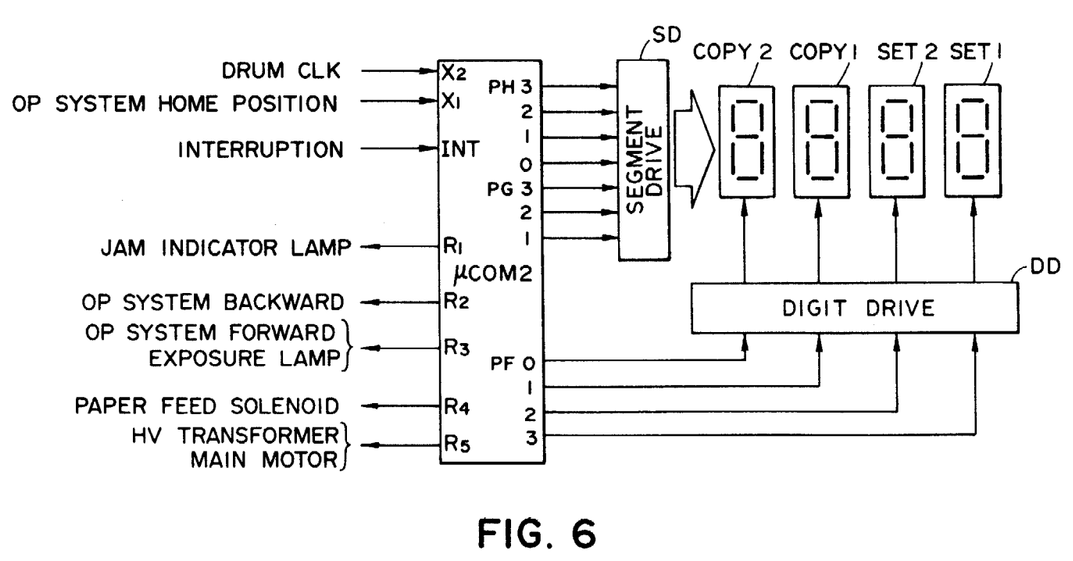
FIG. 6 is a block diagram of a display control system embodying the present invention.
Figure 7:
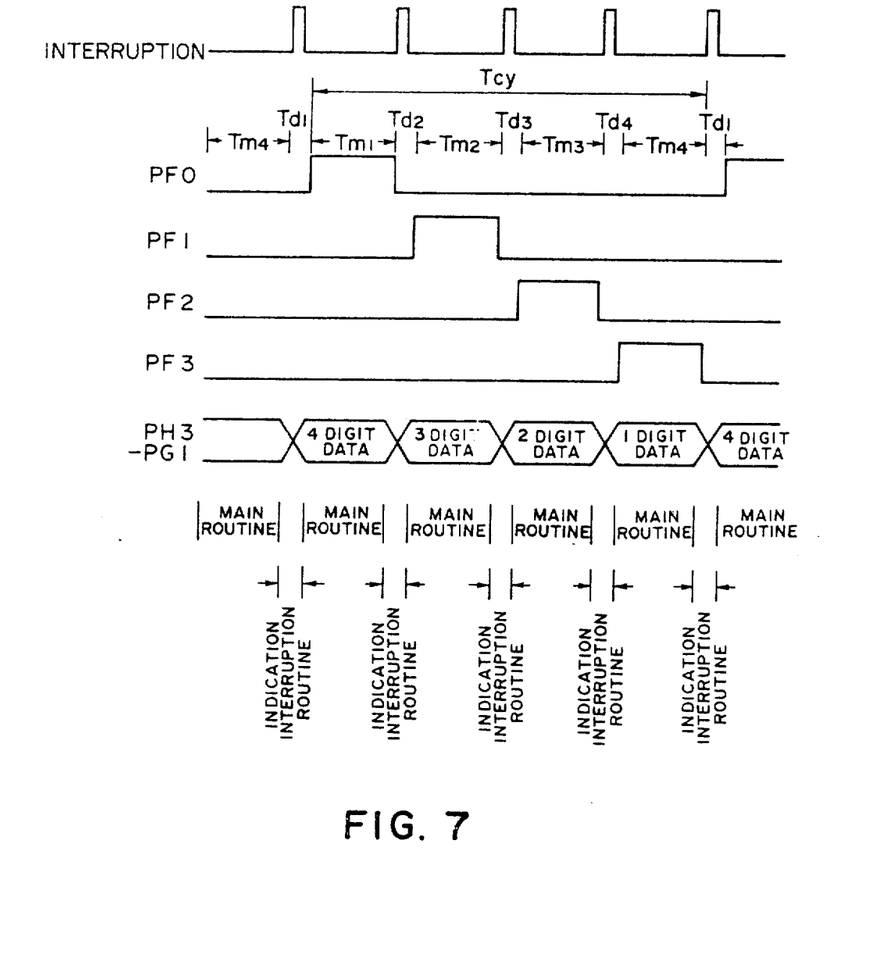
FIG. 7 is a timing chart of the display control system shown in FIG. 6.

FIG. 6 shows the display control system of the present invention in a block diagram, while FIG. 7 shows the timing chart thereof. In FIG. 6 same components as those in FIG. 1 are represented by the same symbols, while μCOM2 is a one-chip microcomputer having an interruption port, composed for example of NEC μCOM43N. There are also shown an output port R1 for releasing a jam indicator signal for lighting a jam indicator lamp in case of paper jamming, and an output port R5 for activating a main motor for driving the drum 11 and a high-voltage transformer at the turning on of the power supply.

Figure 8:
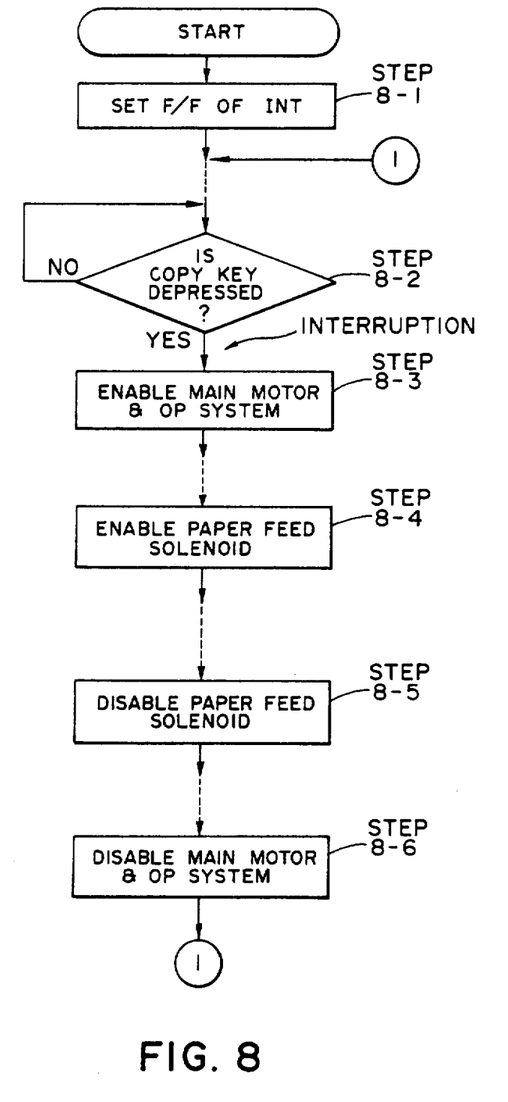
FIGS. 8 and 9 are control flow charts thereof.

Now the function of the above-explained display control system will be explained by the control flow chart shown in FIG. 8.

Upon the turning on of the power supply to the copier, the microcomputer μCOM2 is powered and initiates the control flow. First, in the STEP 8-1, a flip-flop F/F of the interruption port is set to enable entry of the interruption signal, whereby the output ports PF0–PF4 are set in succession in response to the subsequent entries of the interruption signals. The STEP 8-2 identifies whether the copy start key is acutated, and, if yes, the program proceeds to the STEP 8-3 to activate the main motor and the exposure optical system, whereby the original scanning is conducted in the aforementioned manner to form an electrostatic latent image on the drum. The paper feed solenoid is energized in the STEP 8-4 to advance the transfer sheet toward the drum at a determined timing, and is deactivated in the STEP 8-5. After the image transfer is realized, as explained in the foregoing, the main motor and the optical system are turned off in the STEP 8-6 and the program returns to a point after the STEP 8-1.

Figure 9:
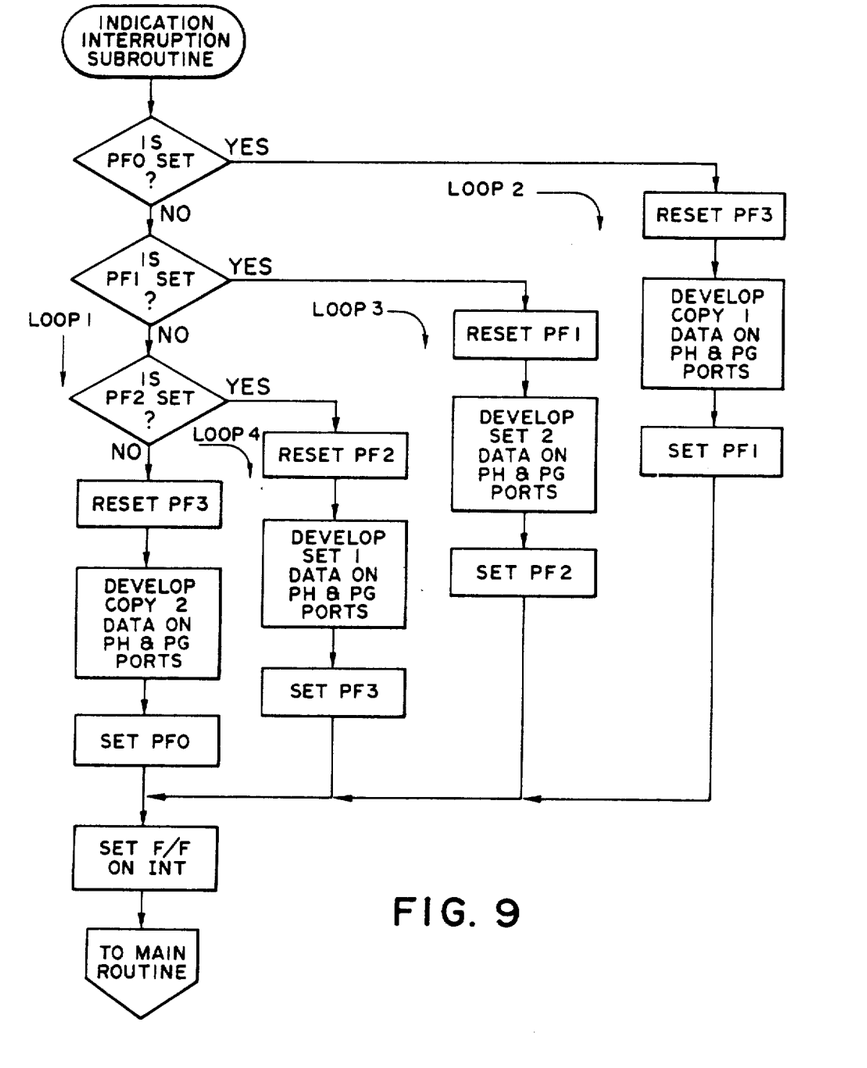

In case an interruption signal is given to the interruption port INT during the execution of the above-explained main routine, for example prior to the STEP 8-3, said interruption signal is entered while resetting the flip-flop F/F thereby initiating an interruption routine as shown in FIG. 9. In said routine a loop 1 is executed, for example if PF3="1" to reset PF 3, to release the data of COPY2 to the ports PH and PG and to set PF0, whereby the digit driver DD releases a level-1 signal to the display COPY2 to light said display device COPY2 for a period Tm1 shown in FIG. 7 in response to the segment driver SD. Thereafter the program sets the flip-flop F/F of the interruption terminal INT to enable the entry of interruption signals, and restarts the execution of the main program from the STEP 8-3. Similarly the loop 2, 3 or 4 is executed respectively if the PF0, PF1 or PF2 is at level-1 state at the entry of the interruption signal, thereby lighting the display device COPY1, SET2 or SET1 respectively for a period Tm2, Tm3 or Tm4.

Said interruption signal is obtained for example from an oscillator of a determined frequency, which is selected lower than that of the drive pulses for the microcomputer but higher than that of the drum clock pulses.

Figure 10:
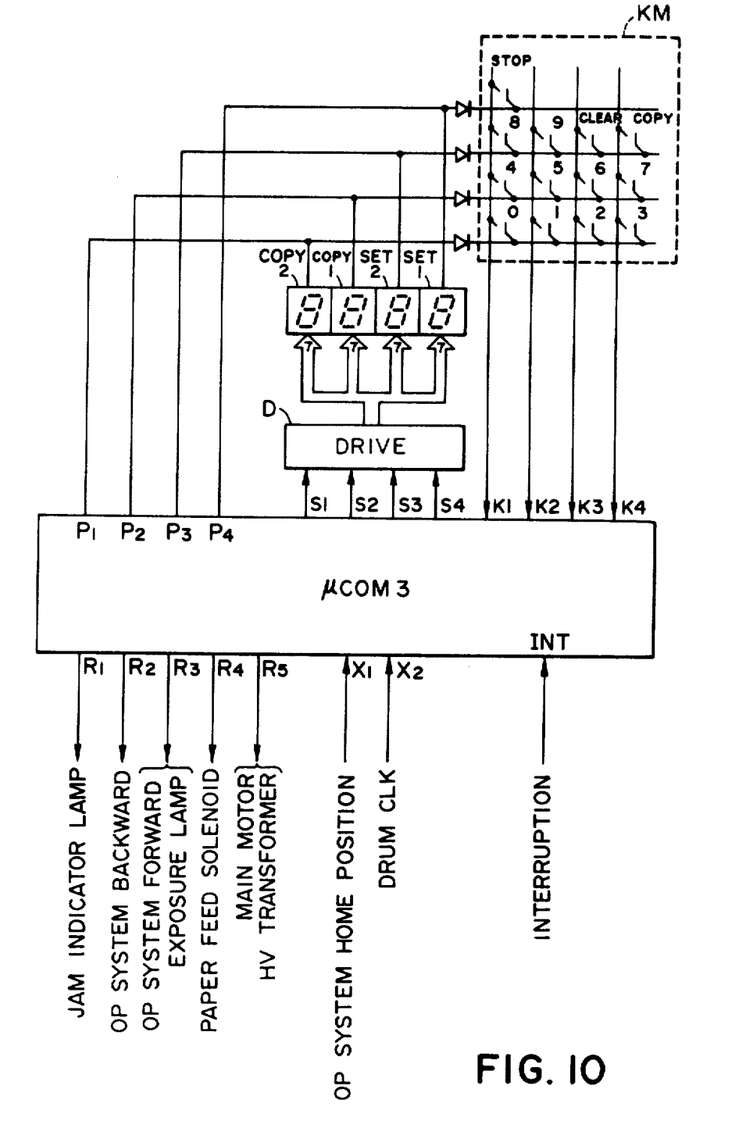
FIG. 10 is a block diagram of the display control system showing another embodiment of the present invention.

The display control system of the present invention can also be composed as shown in FIG. 10 to enable display drive and key entry sensing by the digit signals. In this embodiment the output ports P1–P4 are set in succession in response to each entry of the interruption signal to the interruption port INT thereby effecting dynamic display drive and key entry sensing into a key matrix KM into input ports K corresponding to the output signal P.

For example, a state P1="1" achieved in response to an interruption signal entered to the port INT, causes the display by the device COPY2 and the entry of key signals corresponding to the keys "0", "1", "2" or "3" of the key matrix KM into the respectively corresponding ports K. Similarly the ports P2, P3 and P4 cause the display by the display devices COPY1, SET2 and SET1 and the entry of respectively corresponding key signals into said ports K.

4-bit parallel output ports S supply the data of the first and second digits of the set copy number and the first and second digits of the copy number stored in unrepresented registers in the microcomputer μCOM3 at a display decoder D, which converts said data into 7-bit signals for display by the display devices SET1, SET2, COPY1 and COPY2.

The scan cycle time $T_{cy}$ of each display digit should generally be selected in a range of 5 to 10 msec. as an excessively long cycle time results in a flickering phenomenon.

The key matrix KM shown in FIG. 10 is not limited for sensing the key entry but also is usable for sensing the state of other switches indicating the copying conditions such as the absence of toner or transfer sheet.

Also in case the microcomputer is provided with an event counter for counting an arbitrary number of input pulses, the display timing signals may also be obtained by pulse counting with said event counter. In such case the duty ratio of digit signals can be rendered easily variable since such event counter has a variable pulse count according to a suitable programming. In this manner it is possible to obtain the same luminance even if different kinds of display elements are intermixed, by selecting a suitable duty ratio for each display element.

It is furthermore possible to obtain intermittent lighting, for example of a waiting lamp or a jamming indicator lamp in the waiting state or the jammed state, by frequency division of the interruption signals.

As explained in the foregoing, the present invention, in which the dynamic display control is achieved by interruption signals externally supplied at a determined time interval to the microcomputer, allows maintenance of a constant display drive timing regardless of the execution time of the main program, thereby enabling an ensured dynamic display control without flicker in display.

What we claim is:

1. A display device, comprising:
   a display unit;
   serial signal generating means for generating signals at predetermined time intervals; and
   a microcomputer coupled to control said display unit to provide a flashing display, said microcomputer having a program interruption port for receiving the signal from said serial signal generating means, wherein the flashes of said display are synchronized with said serial signal at a predetermined ratio.

2. A display device according to claim 1, wherein said display unit is adapted to display numbers relating to a copier.

3. A display device according to claim 2, wherein said display unit is composed of 7-segment display elements for displaying a set copy number or a copy number for use in conjunction with a copier machine.

4. A display device according to claim 1, wherein said display unit is adapted to display states of a copier.

5. A display device according to claim 4, wherein said display unit is a jam indicator lamp for use in conjunction with a copier machine.

6. A copying apparatus, comprising:
   image forming means for forming a reproduced image or an original on a recording member;
   input means for generating signals indicating copying conditions;
   display means for displaying states of copying;
   serial signal generating means for generating signals at predetermined time intervals; and
   a microcomputer provided with a program interruption port for receiving signals from said serial signal generating means and adapated for sensing the signals from said input means in response to said signals from said serial signal generating means, wherein the sensing of the signals from said input means is synchronized with said serial signal at a predetermined ratio.

7. A copying apparatus according to claim 6, wherein said display means is adapted to display a set copy number or a copy number.

8. A copying apparatus according to claim 6, wherein said input means is composed of a key input matrix.

9. A copying apparatus according to claim 6, wherein said microcomputer is further adapted for controlling the function of said image forming means in response to a second signal other than said serial signal.

10. A copying apparatus according to claim 9, wherein said period of the serial signal is longer than the period of said second signal.

11. A copying apparatus according to claim 9, wherein said period of the serial signal is shorter than a driving signal of said microcomputer.

12. A copying apparatus according to claim 9, wherein said image forming means has a photosensitive drum, and said second signal is generated in accordance with the rotation of said photosensitive drum.

13. A copying apparatus according to claim 12, wherein said period of the serial signal is longer than the period of said second signal.

14. A copying apparatus according to claim 12, wherein said period of the serial signal is shorter than a driving signal of said microcomputer.

15. A display device according to claim 1 having N display units, wherein said microcomputer causes said display units to flash at N times the period of said serial signal.

16. A copying apparatus according to claim 6, wherein said microcomputer further controls the flashing of said display means in accordance with said serial signal from said serial signal generating means.

17. A copying apparatus according to claim 16, wherein said flashes of the display means are synchronized with said serial signal at a predetermined ratio.

18. A display device comprising:
   display means having a first display element and a second display element,
   serial signal generating means for generating signals at predetermined time intervals, and
   a microcomputer provided with a program interruption port for receiving the signal from said serial signal generating means, wherein said microcomputer drives in turn said first display element and second display element in accordance with said serial signal.

19. A display device according to claim 18, wherein said first and second display elements are seven segment displays respectively.

20. A display device according to claim 19, wherein said first and second display elements display respectively 1's and 10's digits, for use in conjunction with a copier machine to display the number of sheets which are to be copied or set to be copied.

21. A display device according to claim 20, wherein said microcomputer drives said first display element after the driving of said second display element.

* * * * *